United States Patent
Mitch et al.

(10) Patent No.: US 10,562,374 B2
(45) Date of Patent: Feb. 18, 2020

(54) VEHICLE AIR INTAKE APPARATUS, AND METHODS OF USE AND MANUFACTURE THEREOF

(71) Applicant: Honda Motor Co., Ltd., Tokyo (JP)

(72) Inventors: Thomas Mitch, Raymond, OH (US); Marc Powers, Raymond, OH (US); Kyle Mihok, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 677 days.

(21) Appl. No.: 15/044,018

(22) Filed: Feb. 15, 2016

(65) Prior Publication Data

US 2017/0232820 A1    Aug. 17, 2017

(51) Int. Cl.
*B60H 1/28*    (2006.01)

(52) U.S. Cl.
CPC ..................... *B60H 1/28* (2013.01)

(58) Field of Classification Search
CPC ........................................ B60H 1/28
USPC ................................. 454/147, 157
See application file for complete search history.

(56) References Cited

U.S. PATENT DOCUMENTS

| | | | |
|---|---|---|---|
| 2,011,840 A * | 8/1935 | Arnold | B60H 1/28 237/12.3 A |
| 5,022,479 A | 6/1991 | Kiser et al. | |
| 5,139,458 A | 8/1992 | Koukal et al. | |
| 5,145,457 A * | 9/1992 | Tanigaito | B60H 1/28 296/192 |
| 6,347,989 B1 * | 2/2002 | Marko | B60H 1/28 454/111 |
| 7,275,985 B2 | 10/2007 | Lewis et al. | |
| 8,567,852 B2 | 10/2013 | Lacroix et al. | |

FOREIGN PATENT DOCUMENTS

| | | |
|---|---|---|
| JP | S5911978 A | 1/1984 |
| JP | H0354078 A | 3/1991 |
| JP | H03208721 A | 9/1991 |
| JP | H03208781 A | 9/1991 |
| JP | H03213475 A | 9/1991 |
| JP | H0439174 A | 2/1992 |
| JP | 2616081 B2 | 6/1997 |
| JP | 2004058722 A | 2/2004 |

* cited by examiner

*Primary Examiner* — Gregory L Huson
*Assistant Examiner* — Dana K Tighe
(74) *Attorney, Agent, or Firm* — Kenealy Vaidya LLP (57) ABSTRACT

Some embodiments are directed to a deflector for use with a vehicle air intake system that directs air from a vehicle exterior to a vehicle interior. The deflector can include a base configured for attachment to a region of an interior wall of an air compartment adjacent a perimeter of a drain. The deflector can also include a barrier wall connected to the base and including an inner surface that is disposed over the drain when the base is attached to the interior wall of the air compartment. The barrier wall can be shaped to define a concavity between the drain and the inner surface. The barrier wall can define an air stream opening that is disposed to direct air traveling from the drain and through the concavity toward a section of the interior wall of the air compartment that opposes a shield.

20 Claims, 9 Drawing Sheets

VEHICLE AIR INTAKE APPARATUS, AND METHODS OF USE AND MANUFACTURE THEREOF

BACKGROUND

The disclosed subject matter relates to vehicle air intake apparatus, and methods of use and manufacture thereof. In particular, the disclosed subject matter relates to methods and apparatus for directing air traveling toward an intake of a vehicle heating, ventilating, and/or air conditioning (HVAC) system for ultimate delivery to a vehicle passenger compartment.

Many types of vehicles, including but not limited to vehicles that travel on land, include HVAC systems to provide air to a vehicle passenger compartment. This air can be provided directly to the passenger compartment, such as for ventilation, to enhance the supply of fresh air, and/or can be heated, cooled, etc., to achieve a desired climate within the passenger compartment. The impact of the supply and/or conditioning of the air can be especially pronounced or beneficial in the context of closed passenger compartments.

SUMMARY

The source of the air can be disposed at a variety of locations around an exterior of the vehicle. In some cases, an air intake or vent is provided at a base of a vehicle windshield adjacent a rear edge of a vehicle hood, such as at a gap separating a windshield base and a hood rear edge. Disposing the air intake at this location may be especially effective by virtue of the prevalence of pressurized air due to the forward travel of the vehicle. The air entering the air intake can be directed along or within an air compartment (such as a compartment disposed beneath the vehicle hood and in front of the vehicle compartment) to air conditioning apparatus, and ultimately to the passenger compartment.

This air intake can be in the form of an aperture extending laterally along the vehicle, and can be covered with a blocking structure to impede entry of debris (such as solid objects, snow, etc.) into the aperture. The blocking structure can be in the form of a mesh, grid pattern, etc., that allows passage of air but tends to block or impede the entry of debris into the aperture.

Small particles and/or fluid(s) (such as liquids, e.g., water) may tend to travel past the blocking structure and enter the air compartment via the aperture. The amount of water entering the aperture may be especially prevalent under certain circumstances, such as in cases of heavy rain, the melting of snow and/or ice accumulated over and/or adjacent the blocking structure, etc. Some vehicles can therefore be equipped with drains to allow the water and/or other fluids, particles, etc., to exit the air compartment. The drains can be disposed at a lower portion of the air compartment, and the air compartment can be shaped to direct water toward the drain. In other words, the drains can be disposed so that water is naturally directed thereto by gravity, etc.

Under certain circumstances, the air supplied to the passenger compartment may entrain an undesirably high amount of water (hereinafter overly saturated air), resulting in the passage or supply of overly humid air and/or water particles, such as to the passenger compartment. For example, drainage of the water from the air compartment may not be sufficiently effective to prevent the air in the air compartment from entraining too much water. Wet surfaces within the compartment may also be responsible for this undesirably high water entrainment.

This water entrainment may also be created or exacerbated by other circumstances, such as where a negative pressure has been created within certain areas of the air compartment. Blockage of some of the air intake vents (thereby impeding entry of air into the air compartment from the base of the windshield) and/or an increased demand for air within the passenger compartment (which may involve running an air supply fan at high speed) may create a negative pressure within certain areas of the air compartment. This negative pressure may cause air to enter the air compartment from the drain and/or areas around the drain. This air may have an especially high humidity (thereby constituting overly saturated air), and may increase the amount of water entrained by the supply air, resulting in air that has entrained an undesirably high amount of water being supplied to the passenger compartment.

It may therefore be beneficial to address situations that may result in air that has entrained an undesirably high amount of water (overly saturated air) being supplied to the passenger compartment. For example, it may be beneficial to provide methods and/or apparatus for causing the removal of an amount of water from the overly saturated air prior to being supplied to the passenger compartment. Some of these methods and apparatus may remove water from air traveling from areas within or adjacent the drain.

Some embodiments facilitate removal of an amount of water from the overly saturated air by providing a shield at a certain location within the air compartment. Some of these embodiments provide the shield within the air compartment generally between an entry opening of the drain and an intake from the air compartment into the HVAC system and/or passenger compartment. The shield disposed at this location can also be configured to intercept some or all of the air traveling from the drain toward the intake leading to the HVAC system and/or passenger compartment. This interception (e.g., contact between the overly saturated air and the shield) can result in removal of an amount of water from the overly saturated air, which may then be supplied to the HVAC system and/or passenger compartment.

Some of these embodiments can be configured to cause the overly saturated air to additionally be intercepted by another surface or surfaces, such as surface(s) that define the air compartment. In some embodiments, this other surface is constituted by a surface of a dashboard upper side member, which defines an end of the air compartment. This surface of the dashboard upper side member may generally oppose the shield, such that air traveling from and/or adjacent the drain is intercepted by both the surface of the dashboard upper side member and the shield so as to remove an amount of water from the overly saturated air.

Embodiments are intended to include or otherwise cover any and all methods and apparatus to direct air from areas at or adjacent the drain toward the surface of the dashboard upper side member. Some of these embodiments include a deflector disposed within the air compartment and over the drain. In some of these embodiments, the deflector is disposed to cover the upper opening of the drain, defines a concavity over the drain, and is configured to define an opening generally facing the surface of the dashboard upper side member. This opening can be configured to direct air traveling from the drain and through the concavity toward the surface of the dashboard upper side member. The air impacting the surface of the dashboard upper side member is thereby directed toward the shield to thereby also impact the shield. Impacting both the surface of the dashboard upper side member and the shield enhances removal of water from the overly saturated air traveling from areas at or around the drain.

Some embodiments are therefore directed to a deflector for use with a vehicle air intake system that directs air from a vehicle exterior to a vehicle interior. The air intake system can include an air compartment that is defined by an interior wall and configured to access air at the vehicle exterior. The interior wall of the air compartment can define an air intake channel that is configured to enable air to travel from the air compartment toward the vehicle interior. The interior wall of the air compartment can define a drain that is configured and disposed to receive and remove a liquid from the air compartment. The air intake system can include a shield disposed in the air compartment generally between the drain and the air intake channel. The shield can be configured and disposed to generally oppose an opposing section of the interior wall of the air compartment.

The deflector can include a base configured for attachment to a region of the interior wall of the air compartment adjacent a perimeter of the drain. The deflector can also include a barrier wall connected to the base and including an inner surface that is disposed over the drain when the base is attached to the interior wall of the air compartment. The barrier wall can be shaped to define a concavity between the drain and the inner surface, and can define an air stream opening that is disposed to direct air traveling from the drain and through the concavity toward the opposing section of the interior wall of the air compartment.

Some other embodiments are directed to a vehicle air intake system that directs air from a vehicle exterior to a vehicle interior. The vehicle air intake system can include an air compartment that is defined by an interior wall and configured to access air at the vehicle exterior. The interior wall of the air compartment can define an air intake channel that is configured to enable air to travel from the air compartment toward the vehicle interior. The interior wall of the air compartment can define a drain that is configured and disposed to receive and remove a liquid from the air compartment.

The vehicle air intake system can also include a shield disposed in the air compartment generally between the drain and the air intake channel. The shield can be configured and disposed to generally oppose an opposing section of the interior wall of the air compartment. The vehicle air intake system can further include a deflector. The deflector can include a base configured for attachment to a region of the interior wall of the air compartment adjacent a perimeter of the drain. The deflector can also include a barrier wall connected to the base and including an inner surface that is disposed over the drain when the base is attached to the interior wall of the air compartment. The barrier wall can be shaped to define a concavity between the drain and the inner surface, and can define an air stream opening that is disposed to direct air traveling from the drain and through the concavity toward the opposing section of the interior wall of the air compartment.

Still other embodiments are directed to a method of manufacturing a deflector for use with a vehicle air intake system that directs air from a vehicle exterior to a vehicle interior. The air intake system can include an air compartment that is defined by an interior wall and configured to access air at the vehicle exterior. The interior wall of the air compartment can define an air intake channel that is configured to enable air to travel from the air compartment toward the vehicle interior. The interior wall of the air compartment can define a drain that is configured and disposed to receive and remove a liquid from the air compartment. The air intake system can include a shield disposed in the air compartment generally between the drain and the air intake channel. The shield can be configured and disposed to generally oppose an opposing section of the interior wall of the air compartment.

The method can include: configuring a base for attachment to a region of the interior wall of the air compartment adjacent a perimeter of the drain; connecting a barrier wall to the base; configuring the barrier wall to include an inner surface that is disposed over the drain when the base is attached to the interior wall of the air compartment; and shaping the barrier wall being so as to define a concavity between the drain and the inner surface and so as to define an air stream opening that is disposed to direct air traveling from the drain and through the concavity toward the opposing section of the interior wall of the air compartment.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. In the drawings, like reference numerals are used to identify like or identical components in the various views of the embodiments.

I. Vehicle Frame

Figure 1:
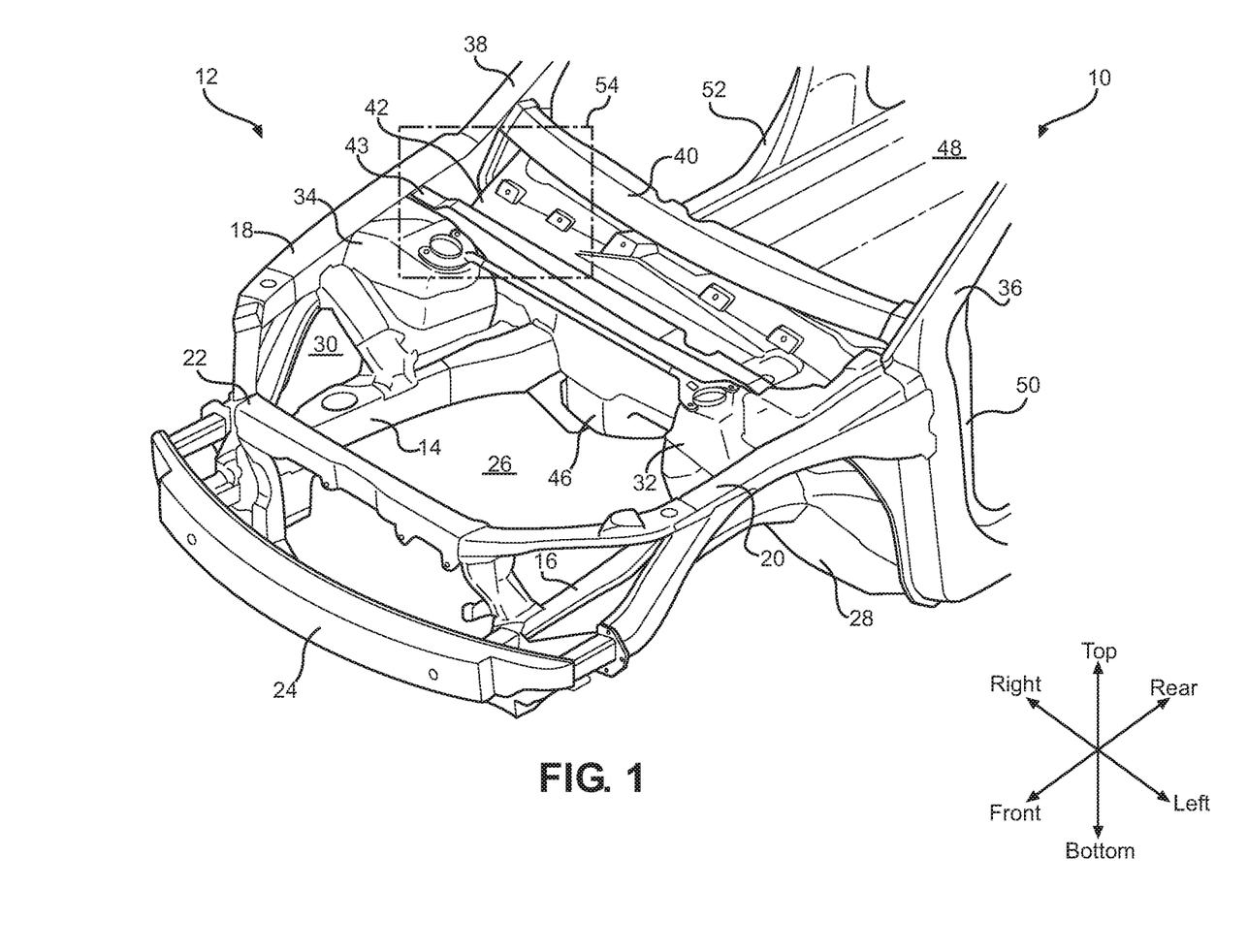
FIG. 1 is perspective view of a vehicle front end frame assembly.

FIG. 1 is perspective view of a vehicle front end frame assembly 12. The front end frame assembly 12 of a vehicle 10 can include structural paths that are typically designed to support vehicle components as well as transfer energy from a site of a front impact in a controlled manner to the remaining frame and body of the vehicle 10. The front end frame assembly 12 can surround an engine compartment 26. For clarity of the disclosure, a hood and side body panels are not shown in the figure. However, a hood can be disposed above, and substantially cover, the engine compartment 26. An upper portion of the front end frame assembly 12 may include a first upper side rail 18, a second upper side rail 20, and a radiator support member 22 extending therebetween. The radiator support member 22 is intended to support a radiator and/or other associated cooling modules, and may additionally support other components such as a hood latch. A lower portion of the front end frame assembly 12 may include a first side rail 14, a second side rail 16, and a front bumper beam 24 that extends between the first side rail 14 and the second side rail 16. The front bumper beam 24 can be disposed within or just behind a front bumper (not shown), and can be the primary load path during a frontal impact.

A back end of the first upper side rail 18 may be attached to a first A-pillar 38, which can receive a front and an upper portion of a first door frame 52. A back end of the second upper side rail 20 may be attached to a second A-pillar 36, which can receive a front and an upper portion of a second door frame 50. A cross member 40 may extend between the first A-pillar 38 and the second A-pillar 36 and can be configured to support a base of a windshield (not shown).

Other structural components disposed near the engine compartment 26 can include a first damper housing 34 disposed adjacent to a first wheel well 30, and a second damper housing 32 disposed adjacent to a second wheel well 28. A cowl support rail 43 can extend between the first upper side rail 18 and the second upper side rail 20. A cowl member 42 can be disposed proximate to a passenger cabin 48 and can extend laterally between the first upper side rail 18 and the second upper side rail 20. The cowl member 42 can utilize the cowl support rail 43 as a front-end support structure. The cowl member 42 can partially or fully cover a dashboard upper member 44 (see FIG. 2), which can be disposed laterally between the first upper side rail 18 and the second upper side rail 20 in proximity to the passenger cabin 48. A dashboard lower member 46 can be disposed generally below and adjacent to the dashboard upper member 44 and can extend laterally between the first upper side rail 18 and the second upper side rail 20.

The embodiments of the disclosure can be located in the cowl area 54 disposed beneath a portion of the cowl member 42 behind a right rearward area of the engine compartment 26. However, the embodiments are intended to include or otherwise cover an appropriate alternative location on the vehicle 10 or an appropriate alternative location on another vehicle.

Vehicles that can be configured with the apparatus of the embodiments can include automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, bicycles, ATVs, tractors, trains, trams, light rail trains, boats, ships, watercraft, aircraft, helicopters, or any transport related entity that includes a fresh air intake as part of a heating, ventilation, and air conditioning (HVAC) system. In fact, the various disclosed methods and apparatus are intended to be usable with any type of manual, automated, semi-automated, or self-driving mode of transport that can travel along, or can be located in proximity to, any improved, unimproved, and/or unmarked route or path.

II. Apparatus for Air Stream Deflection

Figure 2:
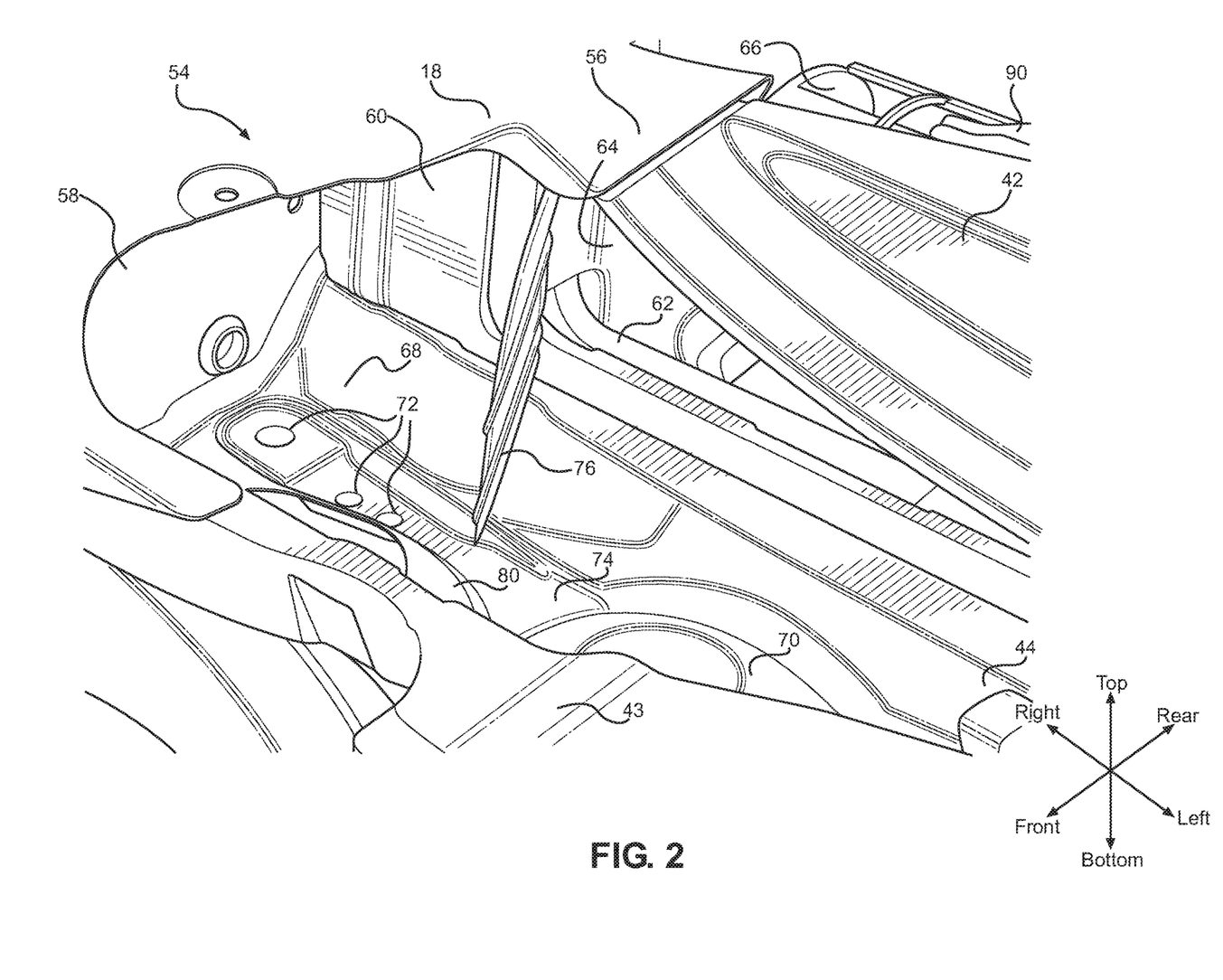
FIG. 2 is a perspective view of a cowl area of the vehicle of FIG. 1.

FIG. 2 is a perspective view of the cowl area 54 of the vehicle 10 of FIG. 1. The view of the cowl area 54 shows a cutout view under the cowl member 42 and can include a right side portion of the dashboard upper member 44, fastened in a perpendicular orientation to a first dashboard upper side member 58, and a dash panel 60 fastened along a bottom edge to the dashboard upper member 44. In the cowl area 54, the dash panel 60 can include the cutout 62 that defines an air intake channel 64, which provides a path for intake air to an HVAC system 90. A right side portion of the cowl member 42 is illustrated fastened to an extended portion 56 that can attach the cowl member 42 to the first upper side rail 18. The fastened joints can be accomplished in any appropriate manner, such as but not limited to mechanical fasteners, glue, epoxy, welding, pressure fitting, etc.

The dashboard upper member 44 can be a member made of a steel plate, aluminum plate, or other appropriate materials such as plastic and can include various stamped, sloped, elevated, and/or flanged structural portions. The dashboard upper member 44 may also extend forward from the dash panel 60 and can isolate the engine compartment 26 from the passenger cabin 48. The dashboard upper member 44 can include a rear wall 68 that is formed or bent upwardly towards the dash panel 60, a front wall 82 (see FIG. 3) that is formed or bent upwardly towards the cowl support rail 43, and a base portion 74 that extends laterally between the lower ends of the rear wall 68 and the front wall 82 and is the portion of lowest elevation of the dashboard upper member 44. The rear wall 68, the front wall 82, and the base portion 74 can be fastened at one end to the first dashboard upper side member 58 and fastened at a second end to a second dashboard upper side member (not shown). Although FIG. 2 illustrates a cutout view of the cowl area 54, an assembled cowl member 42 typically covers the dashboard upper member 44, thereby creating an enclosed air compartment.

The dash panel 60 can be formed from pressed or bent metal panels and can include various stamped, sloped, and/or flanged structural portions that are arranged on different relative planes but primarily extend transversely across the engine compartment 26 between the first A-pillar 38 and the second A-pillar 36. The dash panel 60 can be further disposed in a perpendicular orientation between the dashboard upper member 44 and the passenger cabin 48. The HVAC system 90 can create negative pressure at the air intake channel 64 that will draw air from outside of the vehicle 10 and thereafter push the air into the passenger cabin 48 through one or more air exit channels 66.

The base portion 74 of the dashboard upper member 44 is generally sloped at a gradient towards the first dashboard upper side member 58 along a longitudinal axis of the member. One or more drain paths can be formed in the base portion 74 such that water inside the dashboard upper member 44 can drain out of the cowl area 54. In one embodiment, to assist in directing water to the base portion 74, various portions of the dashboard upper member 44 can be further elevated above the base portion 74. For example, one or more raised portions 70 can function to direct liquid substances (e.g., water, condensation, oily mixes) that enter the cowl area 54 to flow by gravity towards the lowest elevation of the base portion 74 where one or more auxiliary drain openings 72 can facilitate removal of the water out of the upper dashboard member 44. The auxiliary drain openings 72 can be formed as one or more apertures, holes, slots, grids, etc., or any shape that can accomplish the function of providing a drain path to remove water from the base portion 74. In an embodiment, a drain channel 78 (see FIG. 5) can also be disposed in the base portion 74 as a primary drain path to remove water from the upper dashboard member 44. Although the embodiments describe and illustrate the location and orientation of the auxiliary drain openings 72 and the drain channel 78, the dispositions are merely exemplary and could be formed at any location functionally appropriate to drain liquids away from the cowl area 54.

In an alternative embodiment, the auxiliary drain openings 72 can also provide a dual-purpose safety function by accommodating one or more hood rods (not shown). For example, in the event of a pedestrian collision, the hood rods can raise the vehicle's hood in order to reduce the force of impact.

In order to limit and/or impede the overly saturated air from being blown into the passenger cabin 48 by the HVAC system 90 via the air intake channel 64, a shield member 76 can form a physical barrier or wall interposed between the drain channel 78 and the air intake channel 64. The shield member 76 can be a member made of a steel plate, plastic, or other appropriate material formed in a rectangular shape, polygonal shape, irregular shape, etc. The shield member 76 may be fastened at one end to the dash panel 60 such that an opposite end is suspended over the dashboard upper member 44. In an embodiment, the shield member 76 may be oriented at any angle that can more effectively accomplish the function of blocking water entrained in the overly saturated air from the drain channel 78 from flowing into the air intake channel 64. The shield member 76 can thus provide some protection from water droplets that have been entrained in the overly saturated air from being carried into the passenger cabin 48 by the HVAC system 90 by causing the droplets to separate and/or condensate on the shield member 76 and drain onto the base portion 74.

Figure 3:
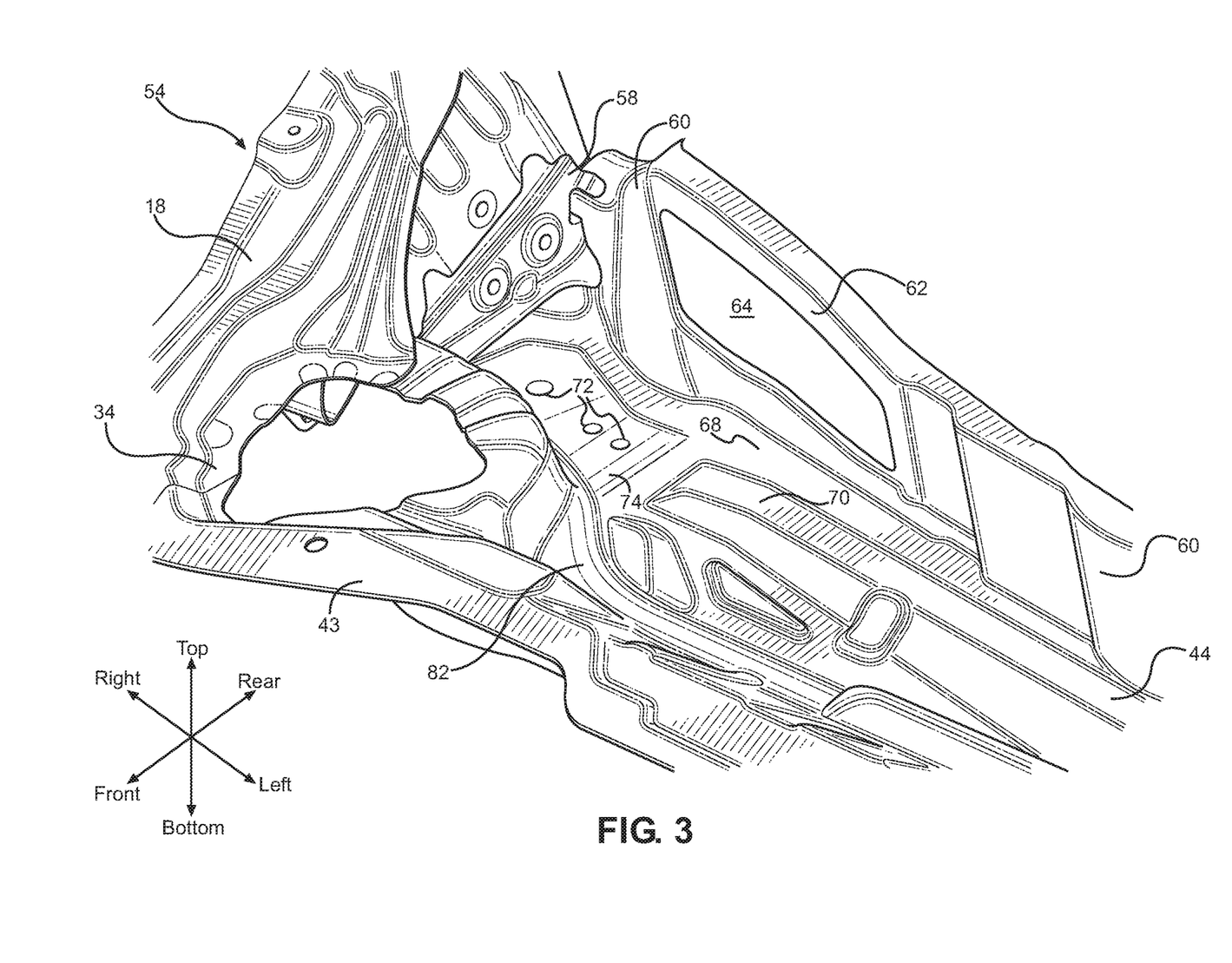
FIG. 3 is an additional perspective view of the cowl area of the vehicle of FIG. 1.

FIG. 3 is an additional perspective view of the cowl area 54 of FIG. 1. For clarity of the disclosure, FIG. 3 does not show the cowl member 42 or the shield member 76 in this view. In FIG. 3, the cowl area 54 can include right-side portions of the dashboard upper member 44, fastened in a perpendicular orientation to the first dashboard upper side member 58, the dash panel 60, fastened along a bottom edge to an upper edge of the rear wall 68 of the dashboard upper member 44. The rear wall 68 can be formed or bent upwardly towards the dash panel 60 and the front wall 82 can be formed or bent upwardly towards the cowl support rail 43. The base portion 74 can extend between the lower ends of the rear wall 68 and the front wall 82. The rear wall 68, the front wall 82, and the base portion 74 are fastened at a right side end to the first dashboard upper side member 58.

The dash panel 60 can be disposed in a perpendicular orientation between the dashboard upper member 44 and the passenger cabin 48. In the cowl area 54, the HVAC intake cutout 62 can define the air intake channel 64. The HVAC intake cutout 62 can be formed as a rectangular, polygonal, oblong, irregular, or any shaped cutout in the dash panel 60. The orientation of the HVAC intake cutout 62 is more clearly illustrated in FIG. 3 as disposed in the same cowl area 54 as the drain channel 78 and opposite to the forward wall 82 of the dashboard upper member 44. A lower edge of the HVAC intake cutout 62 can be elevated a predetermined distance above a top end of the rear wall 68, which can function to prevent water collected in the dashboard upper member 44 from overflowing into the HVAC intake cutout 62 and potentially into the passenger cabin 48. FIG. 3 also more clearly illustrates the close proximity of the intake air channel 64 and the auxiliary drain openings 72 in the base portion 74. The raised portion 70 can assist to direct water that collects on the dashboard upper member 44 along a gradient towards a lower elevation of base portion 74. The collected water can thereafter be removed from the vehicle 10 through the drain channel 78 and/or auxiliary drain openings 72.

Figure 4:
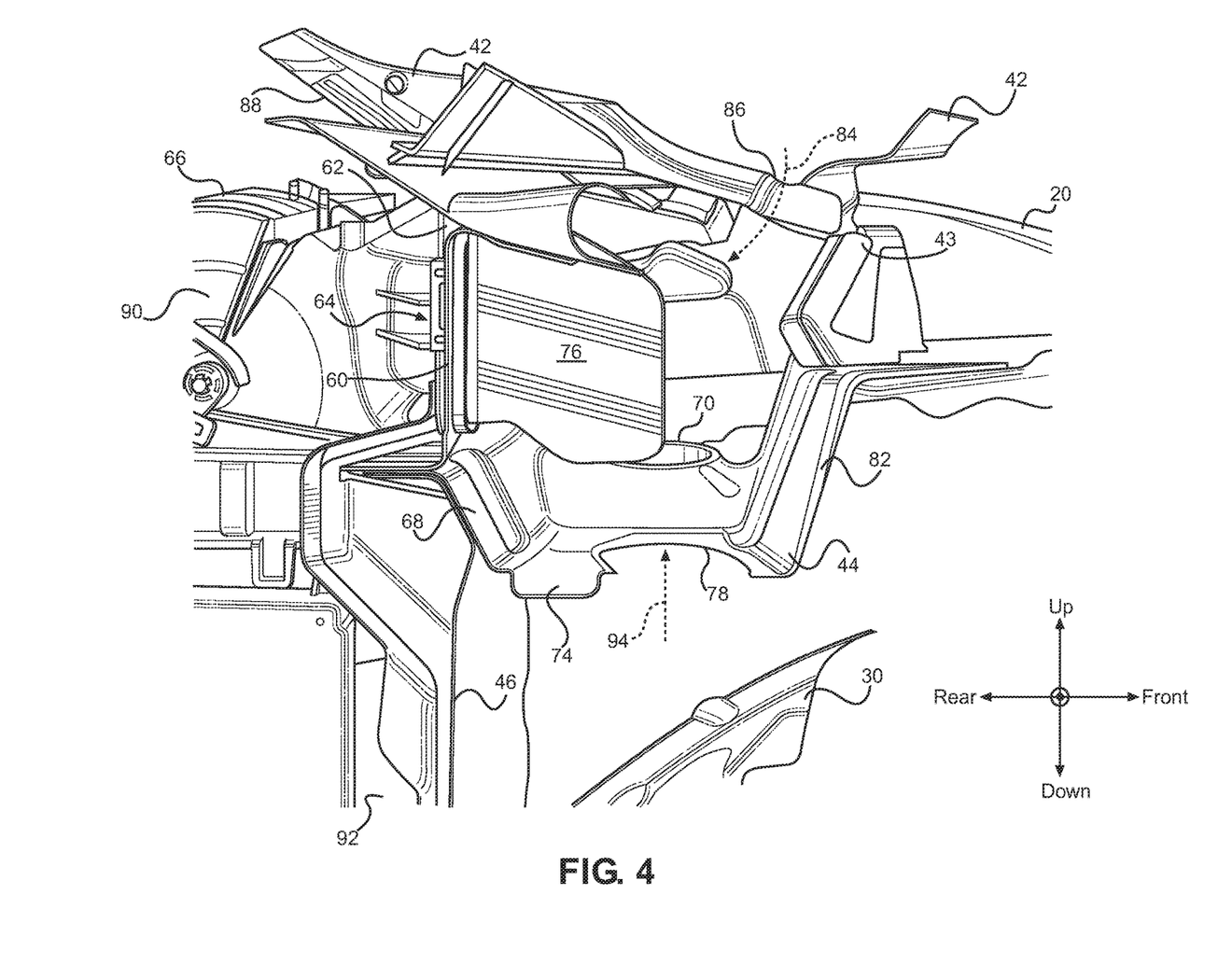
FIG. 4 is a side perspective view of the cowl area as illustrated in FIGS. 2 and 3.

FIG. 4 is a side perspective view of the cowl area 54 as illustrated in FIGS. 2 and 3. For clarity of the disclosure, the first dashboard upper side member 58 is not illustrated in FIG. 4 so that a side view from the right side of the cowl area 54 above the first wheel well 30 can be clearly viewed. FIG. 4 illustrates the upper dashboard member 44 as an elongated member having two opposing, upwardly rising walls along a longitudinal axis that slope outward from the base portion 74. The forward wall 82 can be disposed towards the engine compartment 26, and the rear wall 68 can be disposed towards the passenger cabin 48. The rear wall 68 can include a bent portion disposed between an upper bent portion of the dashboard lower member 46 on a lower side and a lower bent portion of the dash panel 60 on an upper side. The dashboard lower member 46 can downwardly extend between a right front lower A-pillar 92 and a left front lower A-pillar (not shown) to form a partial barrier between the engine compartment 26 and the passenger cabin 48.

In the side view of FIG. 4, the shield member 76 obscures the view of the air intake channel 64 within the dash panel 60. As described above, the air intake channel 64 can direct an air stream in a path through the HVAC system 90, which moves external air from outside the vehicle 10 into the passenger cabin 48. The HVAC system 90 can include a positive displacement blower (not shown) that can induce a negative pressure on intake airflow and transfer supplied air into the passenger cabin 48.

FIG. 4 also includes a side perspective view of the cowl member 42, which can fasten at opposing right and left side ends to the first upper side rail 18 and the second upper side rail 20, respectively, and at its front end to the cowl support rail 43. The cowl member 42 can include an upwardly rising windshield receiving extension 88 disposed at a top, or rearward, portion that can receive a windshield (not shown) of the vehicle 10. The cowl member 42 can also include an air inlet opening 86 disposed at a bottom, or forward, portion. Together, the combined assembly of the dashboard upper member 44, the dash panel 60, the cowl member 42, and the cowl support rail 43 provide an enclosure, or air compartment, that is sealed from communication with the engine compartment 26 and is configured to receive fresh, external air through the air inlet opening 86 via an external air intake path illustrated with dashed arrow 84. In some embodiments, the external air inlet path 84 passes through the windshield receiving extension 88 via a portion of the cowl member 42 that is disposed rearward of a rear edge of a hood. In other embodiments the air inlet opening 86 penetrates a rear region of a hood that is slotted or grilled in order to block debris, snow, etc. from passing through the air inlet opening 86. The air inlet opening 86 can also be formed as a slot or opening or series of slots or openings provided in the cowl member 42 in order to provide a path for external air into the air compartment created by the dashboard upper member 44 and the cowl member 42.

Figure 5:
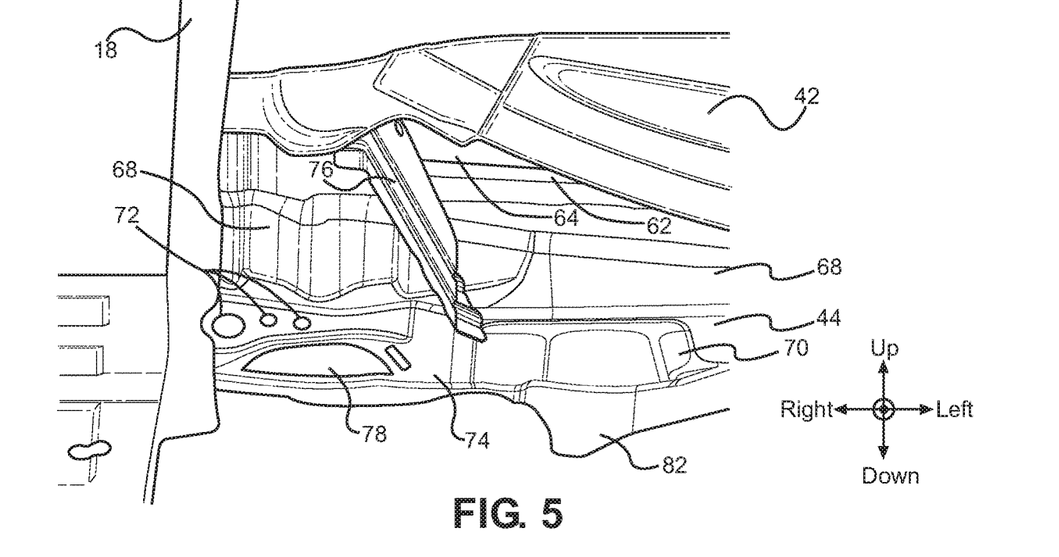
FIG. 5 is a top perspective view of the cowl area as illustrated in FIGS. 2 and 3.

FIG. 5 is a top perspective view of the cowl area 54 as illustrated in FIG. 2. In FIG. 5, a cutaway view of the cowl area 54 covered by the cowl member 42 illustrates the rear wall 68 and forward wall 82 disposed on either side of the base portion 72 of the upper dashboard member 44 forming a gradient channel that can direct water to drainage paths in the base portion 74. When the vehicle 10 is operating within rain or wet weather events, water-entrained, overly saturated air and water droplets can enter through the air inlet opening 86 and cause water droplets to pool in the upper dashboard member 44. To ensure that water can be removed, the base portion 74 can be formed at a sloped gradient that can direct water to the drain channel 78, which can be formed at the lowest point of the base portion 74. In an embodiment, the drain channel 78 can be formed as a primary drain path for removing water collected upon the upper dashboard member 44, while auxiliary drain holes 72 can function as secondary drain paths. The drain channel 78 can be formed as one or more channels, apertures, holes, slots, grids, etc., or any formation that can accomplish the function of providing a drain path for water out of the upper dashboard member. Each of the drain channel 78 and the auxiliary drain openings 72 connect to one common or multiple individual drain hoses (not shown). Each drain hose can be laid or coursed in such a way that water flowing through the hose is guided off to the outside of the engine compartment 26 in a known manner.

As described above, under normal operating conditions the drain channel 78 is capable of removing water entering the air compartment created by the dashboard upper member 44 and the cowl member 42. However, under certain abnormal conditions the air inlet opening 86 can become obstructed, such that the external air intake path 84 becomes blocked. These conditions can include obstruction from snow, leaves, dirt/debris, etc. covering the air inlet opening 86. If obstructed by snow, melting snow may melt and continue to drain water through the air inlet opening 86, which can collect at the base portion 74 and drain down the drain channel 78. Under such conditions, the external air intake path 84, which leads to the HVAC air intake channel 64, becomes blocked while the HVAC system 90 continues to operate. Due to the sealed nature of the dashboard upper member 44 with the cowl member 42, the negative, or vacuum, pressure exerted by the HVAC system 90 at the air intake channel 64 creates a negative pressure condition inside the air compartment defined by the dashboard upper member 44 and the cowl member 42. Under these conditions, negative pressure inside the drain channel 78 is strong enough to create a vacuum within the drain channel 78. The airflow within drain channel 78 can reverse direction to create a drain channel airflow path defined by dashed arrow 94 (see FIG. 4) where external air flows out of the drain channel 78 and into the air intake channel 64. The turbulent (reversed) airflow in the drain channel 78 can entrain water droplets and prohibit collected water from draining therethrough. The result is that the overly saturated air is drawn through the air intake channel 64 by the HVAC system 90 and is blown into the passenger cabin 48. The shield member 76 can deflect a certain amount of the water-entrained air drawn from the drain channel 78 from entering the air intake channel 64. However, the negative pressure generated by the HVAC system 90 can overcome the capability of the shield member 76 when the HVAC system 90 is operating at a high capacity, in which case water droplets caught in the overly saturated air can continue to enter the air intake channel 64 and passenger cabin 48.

Figure 6:
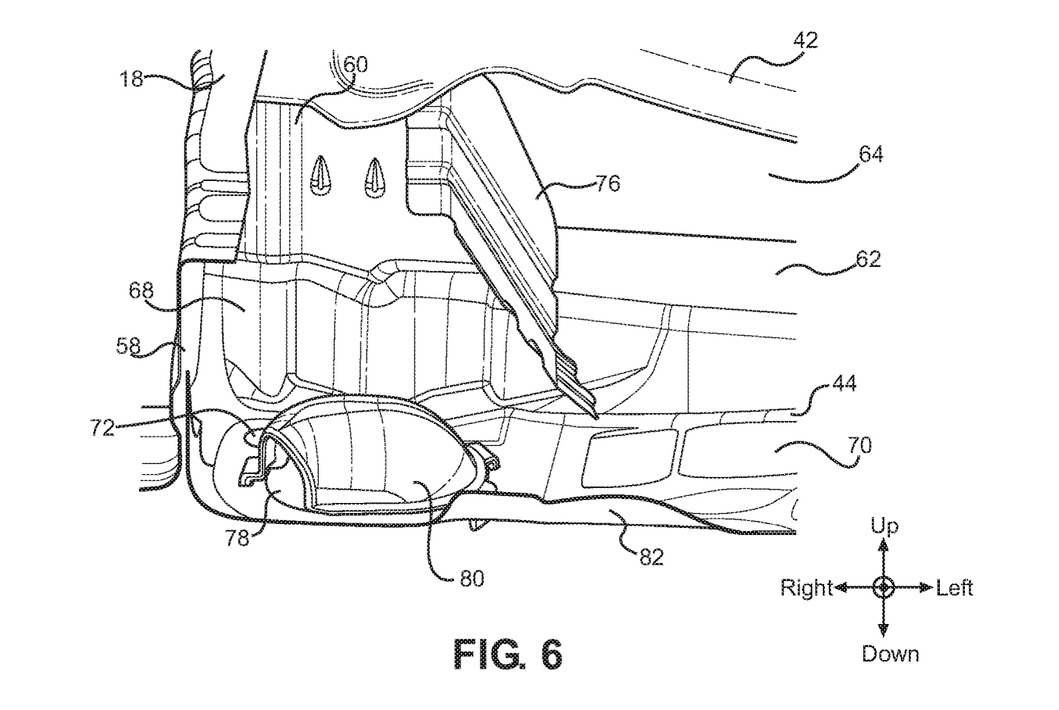
FIG. 6 is a front perspective view of the cowl area as illustrated in FIGS. 2 and 3 having a deflector member of the embodiments disposed therein.

FIG. 6 is a front perspective view of the cowl area 54 as illustrated in FIG. 2. To limit and/or prevent water entrained in the overly saturated air from entering the air intake channel 64, a deflector member 80 can receive the overly saturated air stream, under vacuum pressure from the drain channel 78, and redirect the air stream to impact a solid resistance force in a direction away from the air intake channel 64. For example, an air stream that is under high velocity from the drain channel 78 can expand and slow as it enters the deflector member 80. Water droplets entrained in the air stream in the vertical direction out of the drain channel 78 are then slowed and redirected against a hard surface in the lateral direction, thereby reducing the energy of, and causing the water droplets to fall out of, the overly saturated air stream. The water droplets can collect on the base portion 74 and be removed from the dashboard upper member 44 by gravity draining into one of the auxiliary drain openings 72, disposed in close proximity to the drain channel 78, or by draining back into the drain channel 78 when the vacuum force caused by the HVAC system 90 decreases. Although the auxiliary drain openings 72 are not covered by the deflector member 80, due to the smaller size of the auxiliary drain openings 72 as compared to the drain channel 78, a sufficient force, or head, of water can accumulate in the dashboard upper member 44 over and/or around the auxiliary drain openings 72 until the downward force of gravity on the water to drain down the auxiliary drain openings 72 overcomes the negative upward pressure forces exerted on the water from the HVAC system 90.

In the embodiment described above, the deflector member 80 can redirect an air stream from the airflow path 94 generally away from the air intake channel 64, for example towards the first dashboard upper side member 58. However, the embodiments are intended to include or otherwise cover any direction, angle, or elevation of redirection of the air stream from airflow path 94 out of any type of drain opening or channel in the dashboard upper member 44, or any like member, including, but not limited to, horizontal, vertical, or a redirection of the air stream at an angle between horizontal and vertical into a wall or open space within the cowl area 54.

Figure 7:
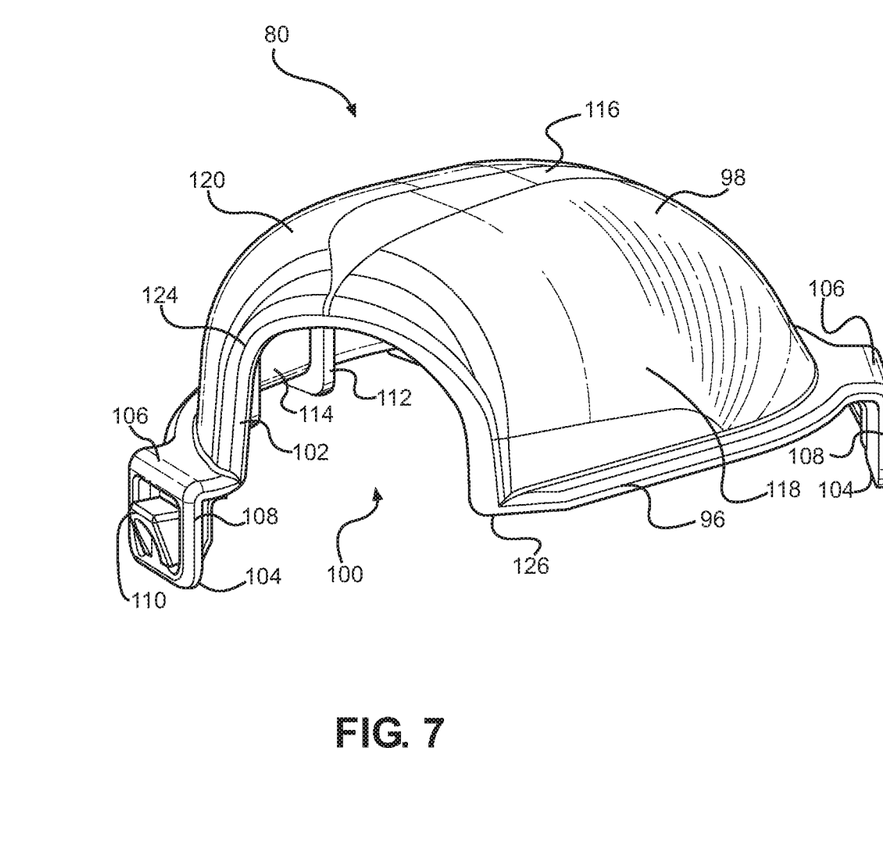
FIG. 7 is a front perspective view of the deflector member of FIG. 6.

FIG. 7 is a perspective view of the deflector member 80 of FIG. 6. The deflector member 80 can be constructed of any material appropriate for installation in a vehicle including, but not limited to, plastic, metal alloy, resin, etc. The deflector member 80 may be an article of manufacture for use in the vehicle 10. However, it is contemplated that the deflector member 80 may be another member of a vehicle located in a similar or alternative location. It is also contemplated that the deflector member 80 may be part of a different article of manufacture.

The deflector member 80 can be formed as a dome-shaped member including a base 126, a barrier wall 98, and a through-hole edge 102 that defines an air stream opening 100. The deflector member 80 has an open bottom defining a concavity under the barrier wall 98 such that, when the deflector member 80 is mounted to the dashboard upper member 44, a convex inner surface 114 of the barrier wall 98 is disposed opposite a surface of the dashboard upper member 44. It should be understood that the deflector member 80 may include fewer or greater components that are illustrated and described herein.

The base 126 is illustrated in FIG. 7 as being generally elliptical having a longitudinal axis along the major axis or longest diameter of the elliptical shape, and transverse axis along the minor axis or the shortest diameter of the elliptical shape. The base 126 can include a flanged portion 96 formed circumferentially along a perimeter of the base 126 that extends in an outward direction away from the barrier wall 98. The shape of the base 126 is merely exemplary, and in other embodiments the base 126 is intended to include or otherwise cover a generally annular, polygonal, irregular, etc. shape or any shape and dimension that can fit around the drain channel 78 and function as described herein. The base 126 is not fully continuous can include two ends that assist to define a lower portion of the air stream opening 100 (e.g., a through-hole) in the barrier wall 98. The base 126 also includes one or more attachments. In the embodiment shown in FIG. 7, the attachments of the base 126 can include one or more fasteners 104 that can be distributed in certain locations around the base 126. Each fastener 104 can extend downward from the flanged portion 96 in an orientation perpendicular to the flanged portion 96. Each fastener 104 can be received by a mounting slot 132 (see FIG. 11) in appropriate corresponding locations around the drain channel 78 in the dashboard upper member 44. The components of the fasteners 104 of the embodiments are described more particularly below.

The barrier wall 98 of the deflector member 80 can be defined by a first side surface 118 and a second side surface 120 that curve upwardly towards one another in a domed configuration to meet a top surface 116 formed as a planar portion along the longitudinal axis. The first side surface 118, the second side surface 120, and the top surface 116 can be formed with a smooth surface texture that is advantageous to minimize air flow resistance. The barrier wall 98 can further include a front surface 124 that is curved upwardly from the base 126 to meet the first side surface 118, the second side surface 120 and the top surface 116. The through-hole edge 102 on the front surface 124 defines the air stream opening 100, which is proportioned advantageously to provide an adequate path for an air stream originating from the drain channel 78 under negative pressure to exit from an interior area of the barrier wall 98 into the air compartment of the dashboard upper member 44. The air stream opening 100 can advantageously provide an unimpeded path for water to drain from the base portion 74 into the drain channel 78 without backing up the water flow.

The barrier wall 98 may optionally obtain structural support from one or more support ribs 112 that can be disposed along the interior surface 114. Each support rib 112 may extend partially or fully between opposing sides of the base 126 and be oriented parallel to the transverse axis. In other embodiments, the support ribs 112 may be oriented in parallel to the longitudinal axis or be provided in any advantageous orientation.

In FIG. 6, the deflector member 80 is mounted upon the upper dashboard member 44 in an orientation around a perimeter of the drain channel 78 where the air stream opening 100 generally faces away from the air intake channel 64, such as toward the first dashboard upper side member 58. As described above, under certain conditions where the air inlet opening 86 is blocked, a negative, or vacuum, pressure can be manifested by the HVAC system 90 at the air intake channel 64, which can create a negative pressure condition within the air compartment of the cowl area 54. Under such conditions, negative air pressure can pull external air up through the drain channel 78 from outside the vehicle 10. The reverse flow of air through the drain channel 78 can create the drain channel airflow path 94 within the drain channel 78, where external air flows through the drain channel 78 into the air intake channel 64. This turbulent airflow can entrain water droplets otherwise draining into the drain channel 78 and can further prohibit water collected on the upper dashboard member 44 from draining therethrough. Various embodiments of the deflector member 80 can limit or prevent water droplets entrained in the overly saturated air from the drain channel 78 from reaching the passenger cabin 48. The overly saturated air exiting from the drain channel 78 can first encounter a larger volumetric area of the interior concavity of the deflector member 80 (as compared to the smaller volumetric area of the drain channel 78), thereby slowing the velocity of the air stream. As the velocity of the air stream slows exiting the drain channel 78, some entrained water droplets will drop out of the air stream that can drain back towards the drain channel 78 and exit the vehicle 10 once the negative pressure forces cease. Further, the air stream exiting the drain channel 78 can encounter the interior wall 114 of the deflector member 80. The turbulence caused by the contact against the convex inner surface 114 of the deflector member 80 can also cause some entrained water droplets to drop out of the air stream. As pressure builds inside of the deflector member 80, the air stream will seek a path of low pressure and low resistance, which in this case is the air stream opening 100. However, the air stream opening 100 is at a perpendicular orientation to the outlet of the drain channel 78, thereby causing further turbulence within the deflector member 80 when the air stream changes direction. Since the air stream opening 100 is smaller than the front surface 124, the air stream becomes restricted and increases in velocity upon exiting the deflector member 80. The air stream will then decrease in velocity once the air stream enters the air compartment of the cowl area 54. The air stream opening 100 of the deflector member 80 can direct the air stream towards the first dashboard upper side member 58 where it will meet resistance. Upon impact with the first dashboard upper side member 58, the air stream will experience additional turbulence and expand, thereby slowing the air stream, which causes entrained water to drop out of the air stream prior to encountering the shield member 76. In an alternative embodiment, the orientation of the air stream opening 100 can direct the air stream towards any surface or member in the cowl area 54 that can cause resistance, and therefore turbulence, in the air stream.

Figure 8:
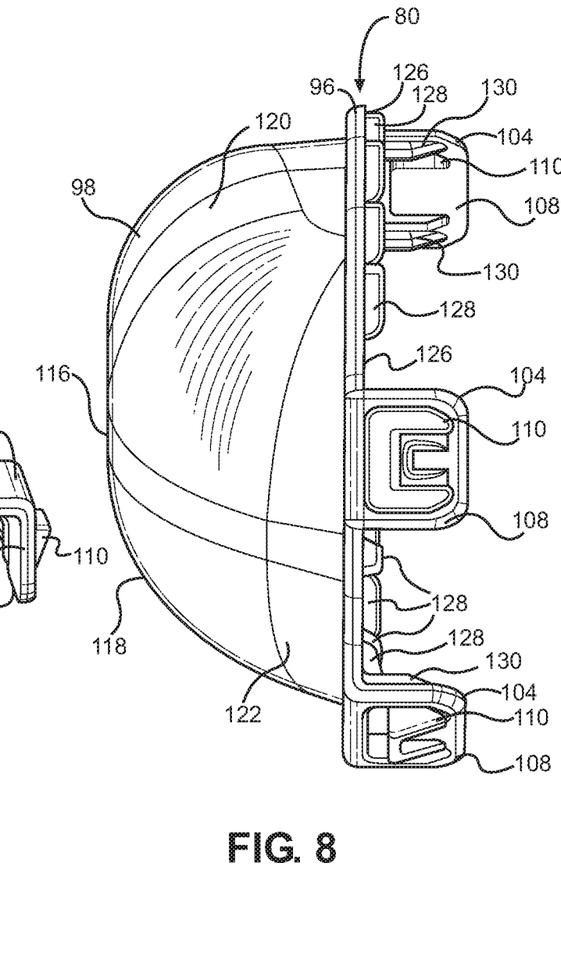
FIG. 8 is a rear perspective view of the deflector member of FIG. 6.

FIG. 8 is another perspective view of the deflector member 80 of FIG. 6. FIG. 8 illustrates a rear perspective view of the deflector member 80 that includes the base 126, the barrier wall 98, and the fasteners 104. The barrier wall 98 of the deflector member 80 can be further defined by the first side surface 118 and the second side surface 120 that curve upwardly to meet the top surface 116. The top surface 116 can be formed along the longitudinal axis and can flatten as a planar portion at a top of the barrier wall 98. The barrier wall 98 can further include a back surface 122 that is curved upwardly from the base to meet the first side surface 118, the second side surface 120, and the top surface 116. The through-hole edge 102 is not visible in the rear view of FIG. 8.

In FIG. 8, one or more rib base portions 128 of the support ribs 112 are illustrated extending below the base 126. Each support rib 112 can extend from the barrier wall 98 and can include a rib base portion 128 disposed under the base 126. The rib base portion 128 of the rib 112 can extend away from the barrier wall 98 and abut a lower surface of the flanged portion 96. However, in other embodiments each support rib 112 does not extend beyond a perimeter of the inner wall 114.

The fasteners 104 can be disposed around the base 126 as appropriate to secure the deflector member 80 onto a surface according to the site of installation and orientation of the deflector member 80. It should be understood that the use of the fasteners 104 to mount the deflector member 80 are merely exemplary, and alternative embodiments can include other mechanisms or components for fastening the deflector member 80 to a surface such as but not limited to mechanical fasteners, glue, epoxy, welding, pressure fitting, etc. In the embodiments, each fastener 104 can attach to and extend away from the flanged portion 96 in an orientation perpendicular to the flanged portion 96. Each fastener 104 can include a fastener housing 108, at least one retaining clip 110, and at least one support prong 130. The fastener housing 108 is a structural frame member defining a central opening that supports the retaining clip 110. The retaining clip 110 can include two prongs attached at a head and can extend outward from the fastener housing 108. The retaining clip 110 may pivot from the lower ends of the prongs in order to press fit the retaining clip 110 into the mounting slot 132. An opposing side of the fastener housing 108, facing inwards towards the barrier wall 98, can include the one or more support prongs 130 that can function as fastening members that extend downward from the top of each fastener housing 108. Each support prong 130 can be oriented in an opposing disposition of each prong of the retaining clip 110, such that the retaining clip 110 and the support prongs 130 press fit against each other when mounted into the mounting slot 132.

Figure 9:
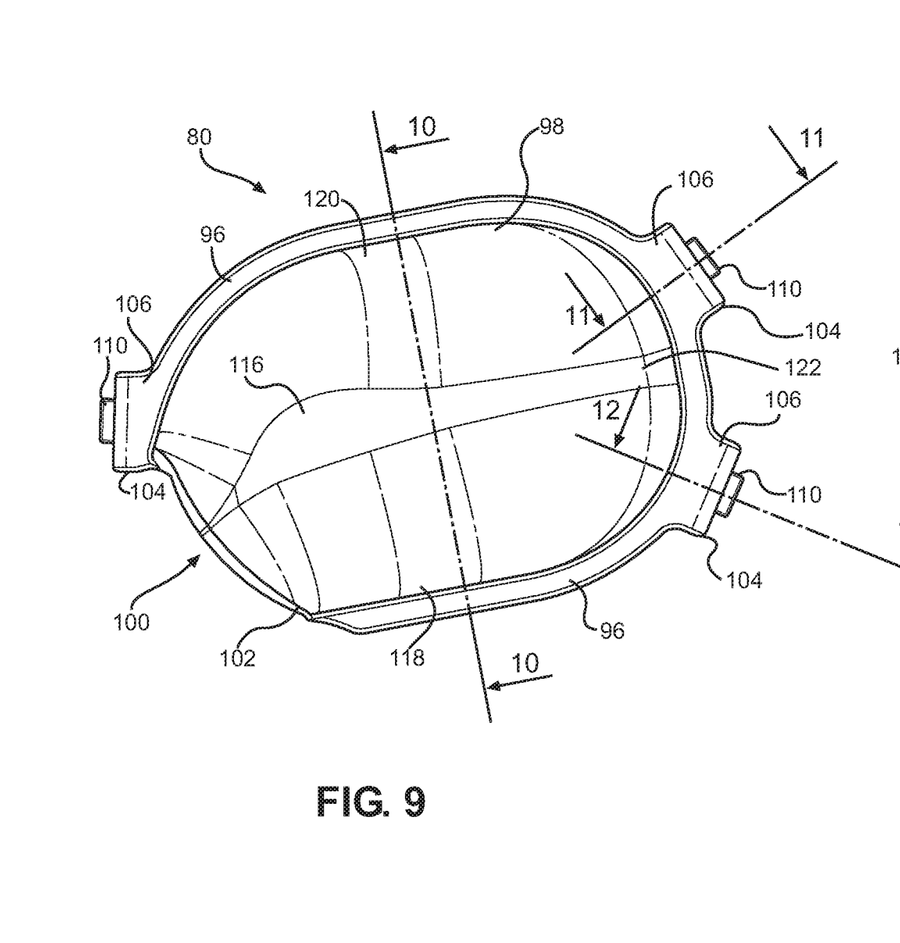
FIG. 9 is a top view of the deflector member of FIG. 6.

FIG. 9 is a top view of the deflector member 80 of FIG. 6. The view illustrates the barrier wall 98, the flanged portion 96, the through-hole edge 102 and three fasteners 104. In an exemplary configuration, one of the fasteners 104 can be disposed adjacent the air stream opening 100 and other similar fasteners 104 can be disposed near the back surface 122.

Figure 10:
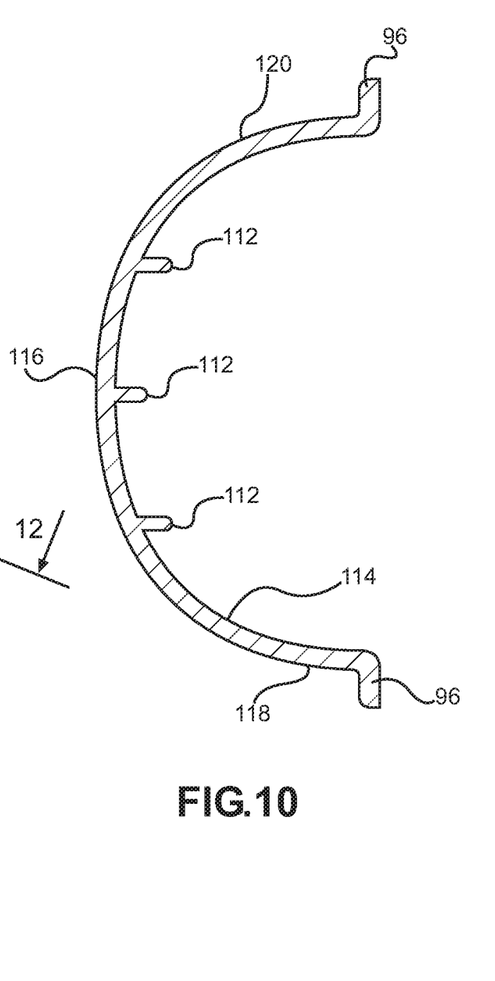
FIG. 10 is a cross-section view across the lateral axis of the deflector member of FIG. 6.
Figure 11:
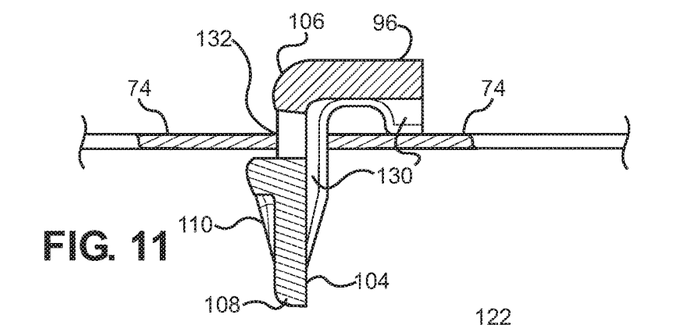
FIG. 11 is a cross-section view of a fastener of the deflector member of FIG. 6.

FIG. 9 illustrates three cross-section lines intersecting the deflector member 80. A first cross-section line 10-10 generally follows the transverse axis of the deflector member 80. The side view of cross-section 10-10 is illustrated in FIG. 10. A second cross-section line 11-11 generally bisects one of the fasteners 104 that is disposed adjacent to the back surface 122 and located longitudinally opposite to one of the fasteners 104 adjacent to the air stream opening 100. The side view of cross-section 11-11 is illustrated in FIG. 11. A third cross-section line 12-12 generally bisects another of the fasteners 104 that is disposed adjacent to the back surface 122 and located longitudinally opposite to the air stream opening 100. The side view of cross-section line 12-12 is illustrated in FIG. 12.

FIG. 10 is a cross-section view across the lateral axis of the deflector member 80 of FIG. 6. FIG. 10 illustrates the dome-shaped profile of the barrier wall 98 that includes the first side surface 118 and the second side surface 120 that upwardly rise to meet the top surface 116. Each lower end of the first side surface 118 and the second side surface 120 meet the flanged portion 96. In an alternative embodiment, one or more structural ribs 112 can be oriented longitudinally along the interior wall 114. In the embodiment illustrated in FIG. 10, the profile of cross-section 10-10 shows the top portions of three exemplary structural ribs 112 that are disposed attached to the convex inner surface 114.

FIG. 11 is a cross-section view of one of the fasteners 104 of the deflector member 80 of FIG. 6. In FIG. 6, one of the fasteners 104 is illustrated mounted into the mounting slot 132 in the base portion 74 of the upper dashboard member 44. The fastener 104 can include the fastener housing 108, the retaining clip 110, and the support prong 130. A protrusion 106 of the retaining clip 104 connects the fastener housing 108 with the flanged portion 96. The fastener housing 108 is structure frame member defining a central opening that supports the retaining clip 110. The retaining clip 110 can include two prongs attached at a head and normally extends outward from the fastener housing 108; however the cross-section in FIG. 11 illustrates a head portion of the retaining clip 100 that connects the two prongs to one another. The support prongs 130 can be utilized as additional fastening members for each fastener 104. Each support prong 130 can be oriented in an opposing disposition of the retaining clip 110, such that the retaining clip 110 and the support prongs 130 press fit together when mounted into the mounting slot 132. FIG. 11 illustrates the support prong 130 abutting a lower face of the flanged portion 96 and curving downward under the protrusion 106 to an orientation adjacent to the fastener housing 108.

Figure 12:
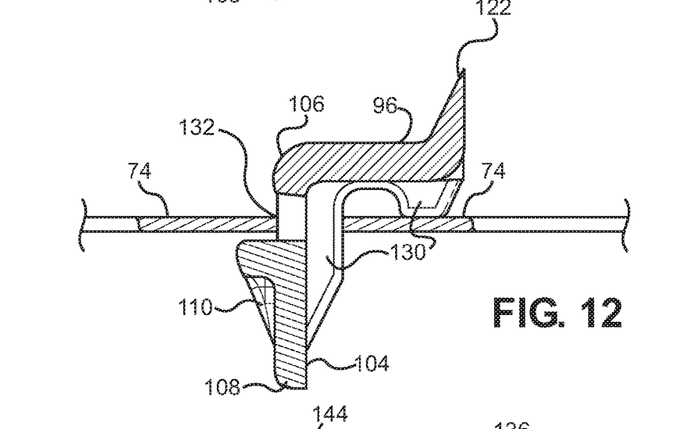
FIG. 12 is a cross-section view of another fastener of the deflector member of FIG. 6.

FIG. 12 is a cross-section view of another one of the fasteners 104 of the deflector member 80 of FIG. 6. In FIG. 12, one of the fasteners 104 is illustrated mounted into the mounting slot 132 in the base portion 74 of the upper dashboard member 44. Each fastener 104 can include the fastener housing 108, the retaining clip 110, and the support prong 130. The protrusion 106 of the retaining clip 104 connects the fastener housing 108 with the flanged portion 96, which connects to the barrier wall 98. The fastener housing 108 is structural frame member defining a central opening that supports the retaining clip 110. The retaining clip 110 can include two prongs attached at a head that normally extend outward from the fastener housing 108. The support prongs 130 can be utilized as additional fastening members for the fastener 104. Each support prong 130 can be oriented in an opposing disposition of the retaining clip 110, such that the retaining clip 110 and the support prongs 130 press fit together when mounted into the mounting slot 132. FIG. 12 further illustrates the support prong 130 abutting a lower face of the flanged portion 96 and curving downward under the protrusion 106 to an orientation adjacent to the fastener housing 108.

Figure 13:
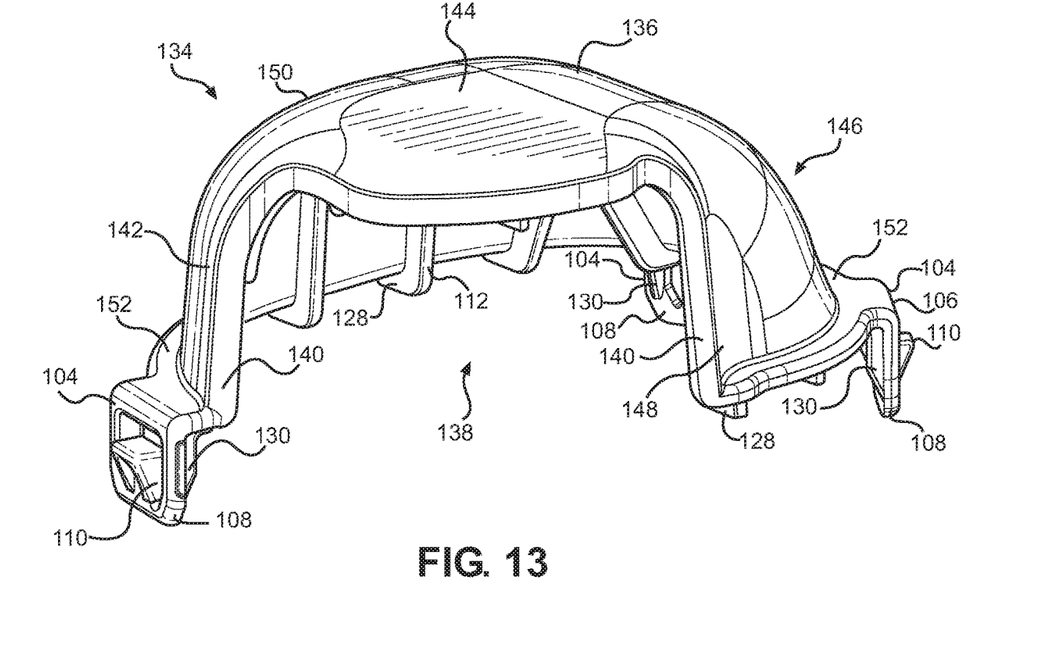
FIG. 13 is a front perspective view of an alternative embodiment of the deflector member of FIG. 6.

FIG. 13 is a front perspective view of an alternative embodiment of the deflector member 80 of FIG. 6. An alternative deflector member 134 can be constructed of any material appropriate for installation in a vehicle that can resist water and structural damage including, but not limited to, plastic, metal alloy, resin, etc. The deflector member 134 may be an article of manufacture for use in the vehicle 10. However, it is contemplated that the deflector member 134 may be another member of a vehicle located in a similar or alternative location. It is also contemplated that the deflector member 134 may be part of a different article of manufacture.

The deflector member 134 can be formed as a dome-shaped member including a flanged base 152, an alternative barrier wall 136, and an alternative through-hole edge 140 that defines an alternative air stream opening 138. The barrier wall 136 forms the dome shape of the deflector member 134, which has an open bottom such that, when the deflector member 134 is mounted to the dashboard upper member 44, the underside of the barrier wall 136 is disposed opposite a surface of the dashboard upper member 44. It should be understood that the deflector member 134 may include fewer or greater components that are illustrated and described herein.

The flanged base 152 is illustrated in FIG. 13 as being generally elliptical, having a longitudinal axis along the major axis or longest diameter of the elliptical shape and transverse axis along the minor axis or the shortest diameter of the elliptical shape. The flanged base 152 can be formed circumferentially along a perimeter of the barrier wall 136. The shape of the flanged base 152 is merely exemplary, and in other embodiments the flanged base 152 may be formed as generally annular, polygonal, irregular, etc. or any configuration and dimension that can fit around the drain channel 78 and function as described herein. The flanged base 152 is not fully continuous and can include two opposing ends that can assist to define a lower portion of the air stream opening 138 (e.g., a through-hole) in the barrier wall 136. The flanged base 152 also includes one or more fasteners 104 that can be disposed around the flanged base 152. Each fastener 104 can extend away from the flanged base 152 in a perpendicular orientation. Each fastener 104 can be received by one of the mounting slots 132 in corresponding locations around the drain channel 78 in the dashboard upper member 44.

The barrier wall 136 of the alternative deflector member 134 can be defined by a first side surface 148 and a second side surface 150 that curve upwardly towards one another in a domed orientation to meet a top surface 144 formed as a planar portion along the longitudinal axis. The first side surface 148, the second side surface 150, and the top surface 144 can be textured with smooth surfaces that are advantageous to minimize air flow resistance. The barrier wall 136 can further include a front surface 142 that is curved upwardly from the flanged base 152 to meet the first side surface 148, the second side surface 150, and the top surface 144. The barrier wall 136 can further include a back surface 146 that is curved upwardly from the base 152 to meet the first side surface 148, the second side surface 150, and the top surface 144. The through-hole edge 140 is an edge of a cutout of the front surface 142 and the first side surface 148 and define a perimeter of the air stream opening 138. The air stream opening 138 is proportionally larger than the air stream opening 100 of the deflector member 80, which can be advantageous to provide a less resistant path for an overly saturated air stream under negative pressure from the drain channel 78 to exit an interior of the barrier wall 136 and to additionally provide a wider path for water droplets to drain from the base portion 74 of the dashboard upper member 44 into the drain channel 78.

The barrier wall 136 may optionally be provided interior structural support from the one or more support ribs 112. Each support rib 112 may extend partially or fully between opposing sides of the flanged base 152 and be oriented parallel to the transverse axis. In other embodiments, the support ribs 112 may be oriented in parallel to the longitudinal axis or be provided in any advantageous orientation.

II. Alternative Embodiments

While certain embodiments of the invention are described above, and FIGS. 1-13 disclose the best mode for practicing the various inventive aspects, it should be understood that the invention can be embodied and configured in many different ways without departing from the spirit and scope of the invention.

The disposition of the deflector member 80 is described within the air compartment of the cowl area 54, however alternative embodiments are intended to include or otherwise cover the deflector member 80 disposed in any location of a vehicle that is interposed between an HVAC system air intake channel and a drain path for removal of fluids from the vehicle.

Although the embodiments for the deflector member 80 and alternative deflector member 134 are described as singular constructed member, the embodiments are intended to include or otherwise cover other deflector members that are constructed from two or more separate components that can cooperate to accomplish the function and structural performance of the deflector member 80 and the alternative deflector member 134. The two or more components may be joined together as a unit or may be separated by physical distances.

In the embodiments, the barrier wall 98 that forms the shape of the deflector member 80 is described as a dome-shaped member. Other embodiments are intended to include or otherwise cover any type of shape for the barrier wall 98 including but not limited to domed, arched, vaulted, bowed, bent, or any shape that function as the embodiments described herein.

Figure 14:
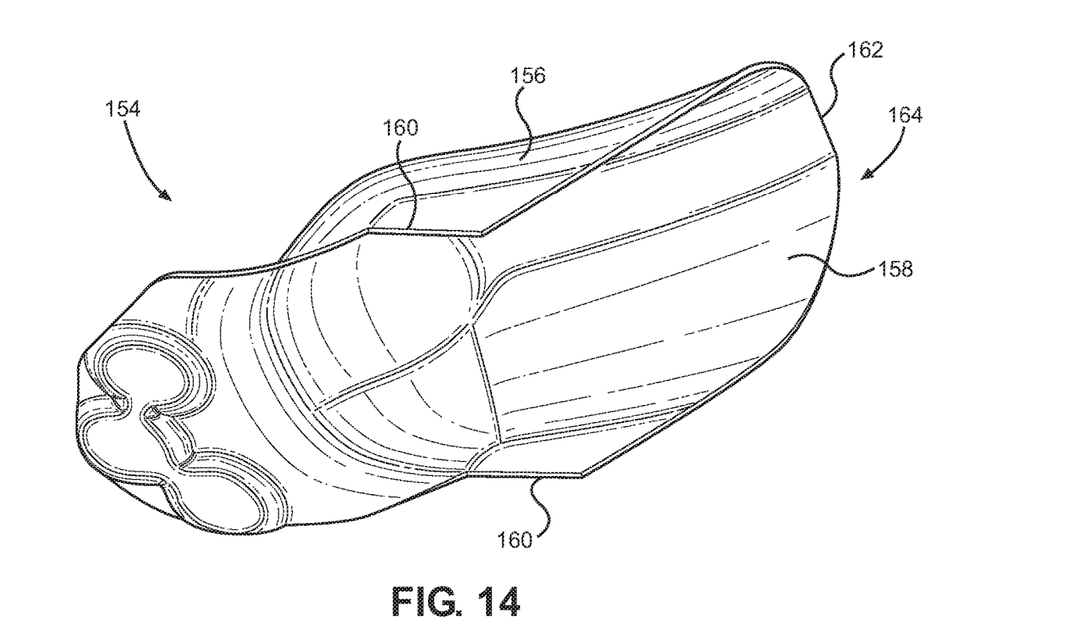
FIG. 14 is a bottom perspective view of an additional alternative embodiment of the deflector member of FIG. 6.
Figure 15:
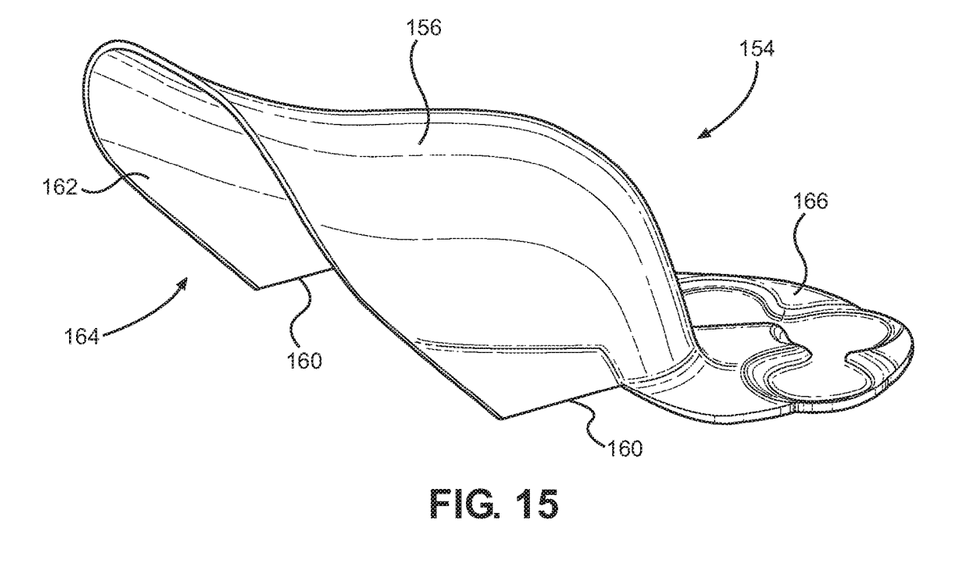
FIG. 15 is a side perspective view of the additional alternative embodiment FIG. 14.

FIG. 14 is a bottom perspective view of an additional alternative embodiment of the deflector member 80 of FIG. 6, and FIG. 15 is a side perspective view of the additional alternative embodiment of the deflector member of FIG. 14. An alternative deflector member 154 can be constructed of any material appropriate for installation in a vehicle that can resist water and structural damage including, but not limited to, plastic, metal alloy, resin, etc. The deflector member 154 may be an article of manufacture for use in the vehicle 10. However, it is contemplated that the deflector member 154 may be another member of a vehicle located in a similar or alternative location. It is also contemplated that the deflector member 154 may be part of a different article of manufacture.

The deflector member 154 can be formed as a dome-shaped member including a base 160, an alternative barrier wall 156, and an alternative through-hole edge 162 that defines an alternative air stream opening 164. The barrier wall 156 forms the dome shape of the deflector member 154, which has an open bottom such that, when the deflector member 154 is mounted to the dashboard upper member 44, the underside of the barrier wall 158 is disposed opposite a surface of the dashboard upper member 44. It should be understood that the deflector member 154 may include fewer or greater components that are illustrated and described herein.

The base 160 may partially or fully attach to a flanged portion 166. The flanged portion 166 can extend away from the base 160 in a perpendicular orientation. The flanged portion 166 can be disposed around the base 160 as appropriate to secure the deflector member 154 onto a surface, such as the dashboard upper member 44, using mechanical fasteners, glue, epoxy, welding, pressure fitting, etc. according to the site of installation and orientation of the deflector member 154. It should be understood that the use of the flanged portion 166 to mount the deflector member 154 is merely exemplary, and alternative embodiments can include other mechanisms or components for fastening the deflector member 154 to a surface such as but not limited to mechanical fasteners, glue, epoxy, welding, pressure fitting, etc.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A deflector for use with a vehicle air intake system that directs air from a vehicle exterior to a vehicle interior, the air intake system including an air compartment that is defined by an interior wall and configured to access the air at the vehicle exterior, the interior wall of the air compartment defining an air intake channel that is configured to enable the air to travel from the air compartment toward the vehicle interior, the interior wall of the air compartment defining a drain that is configured and disposed to receive and remove a liquid from the air compartment, the air intake system also including a shield disposed in the air compartment generally between the drain and the air intake channel, the shield being configured and disposed to generally oppose an opposing section of the interior wall of the air compartment, the deflector comprising:

a base configured for attachment to a region of the interior wall of the air compartment adjacent a perimeter of the drain; and a barrier wall connected to the base and including an inner surface that is disposed over the drain when the base is attached to the interior wall of the air compartment, the barrier wall being shaped to define a concavity between the drain and the inner surface, the barrier wall defining an air stream opening that is unobstructed to the air traveling through the deflector as the air flows from the drain and then through the concavity and then exits the air streaming opening in a direction toward the opposing section of the interior wall of the air compartment, and the barrier wall is spaced away from and spaced below the shield when the base is attached to the interior wall of the air compartment.

2. The deflector according to claim 1, wherein the barrier wall is connected to the base and configured so that air is only able to travel from the drain to an exterior of the concavity via the air stream opening.

3. The deflector according to claim 1, wherein at least portions of the barrier wall are arcuate so as to form a generally dome shaped configuration over the drain, with the air stream opening facing the opposing section of the interior wall of the air compartment.

4. The deflector according to claim 1, wherein at least a portion of the base and the barrier wall are unitary.

5. The deflector according to claim 1, wherein the base includes a flanged portion that is disposed around a perimeter of a bottom of the barrier wall.

6. The deflector according to claim 5, wherein the flanged portion includes a sealing portion that extends away from the bottom of the barrier wall, the sealing portion also extending generally parallel to, and in contact with, a section of the region of the interior wall of the air compartment adjacent the perimeter of the drain.

7. The deflector according to claim 6, wherein the flanged portion includes at least one protrusion that extends generally perpendicular to the sealing portion, and is configured to extend within a mating hole defined in the region of the interior wall of the air compartment adjacent the perimeter of the drain.

8. The deflector according to claim 7, wherein the at least one protrusion includes a retaining clip that is configured to secure the at least one protrusion within the mating hole to thereby impede movement of the base relative to the drain.

9. The deflector according to claim 8, wherein the retaining clip includes a biased camming element that facilitates entry into the mating hole in an insertion direction away from the sealing portion, while impeding exit therefrom in a direction opposite the insertion direction.

10. The deflector according to claim 1, wherein the barrier wall includes at least one rib extending along the inner surface.

11. A vehicle air intake system that directs air from a vehicle exterior to a vehicle interior, the vehicle air intake system comprising:

an air compartment that is defined by an interior wall and configured to access the air at the vehicle exterior, the interior wall of the air compartment defining an air intake channel that is configured to enable the air to travel from the air compartment toward the vehicle interior, the interior wall of the air compartment defining a drain that is configured and disposed to receive and remove a liquid from the air compartment;

a shield immovably disposed in the air compartment generally between the drain and the air intake channel, the shield being configured and disposed to generally oppose an opposing section of the interior wall of the air compartment; and a deflector that includes:

a base attached to a base portion of the air compartment adjacent a perimeter of the drain, and a barrier wall connected to the base and including an inner surface that is disposed over the drain, the barrier wall being shaped to define a concavity between the drain and the inner surface, the barrier wall defining an air stream opening that is unobstructed to the air traveling through the deflector as the air flows from the drain and then through the concavity and then exits the air streaming opening in a direction toward the opposing section of the interior wall of the air compartment.

12. The vehicle air intake system according to claim 11, wherein the barrier wall is connected to the base and configured so that air is only able to travel from the drain to an exterior of the concavity via the air stream opening.

13. The vehicle air intake system according to claim 11, wherein at least portions of the barrier wall are arcuate so as to form a generally dome shaped configuration over the drain, with the air stream opening facing the opposing section of the interior wall of the air compartment.

14. The vehicle air intake system according to claim 11, wherein at least a portion of the base and the barrier wall are unitary.

15. The vehicle air intake system according to claim 11, wherein the base includes a flanged portion that is disposed around a perimeter of a bottom of the barrier wall.

16. The vehicle air intake system according to claim 15, wherein the flanged portion includes a sealing portion that extends away from the bottom of the barrier wall, the sealing portion also extending generally parallel to, and in contact with, a section of the region of the interior wall of the air compartment adjacent the perimeter of the drain.

17. The vehicle air intake system according to claim 16, wherein the flanged portion includes at least one protrusion that extends generally perpendicular to the sealing portion, and is configured to extend within a mating hole defined in the region of the interior wall of the air compartment adjacent the perimeter of the drain.

18. The vehicle air intake system according to claim 17, wherein the at least one protrusion includes a retaining clip that is configured to secure the at least one protrusion within the mating hole to thereby impede movement of the base relative to the drain; and wherein the retaining clip includes a biased camming element that facilitates entry into the mating hole in an insertion direction away from the sealing portion, while impeding exit therefrom in a direction opposite the insertion direction.

19. The vehicle air intake system according to claim 11, wherein the barrier wall includes at least one rib extending along the inner surface.

20. A vehicle air intake system that directs air from a vehicle exterior to a vehicle interior, the vehicle air intake system comprising:
- an air compartment that is configured to access the air at the vehicle exterior, the air compartment includes a rear wall and a base portion extending away from the rear wall, the rear wall of the air compartment defining an air intake channel that is configured to enable the air to travel from the air compartment toward the vehicle interior, the base portion of the air compartment defining a drain that is configured and disposed to receive and remove a liquid from the air compartment;
- a shield immovably disposed in the air compartment generally between the drain and the air intake channel, the shield connected to and extending from the rear wall of the air compartment, and the shield extending along and spaced away from base portion; and
- a deflector that is spaced away from the shield and includes:
  - a base attached to the base portion of the air compartment adjacent a perimeter of the drain, and
  - a barrier wall connected to the base and including an inner surface that is disposed over the drain, the barrier wall being shaped to define a concavity between the drain and the inner surface, the barrier wall defining an air stream opening that is disposed to direct the air traveling from the drain and through the concavity toward a portion of the air compartment that is spaced away from each of the shield and the air intake channel, and the barrier wall extends between the drain and the shield.

\* \* \* \* \*